United States Patent Office 3,433,649
Patented Mar. 18, 1969

3,433,649
COCOA-FLAVORED LIQUID OIL COMPOSITIONS
Robert R. Cooke, Evendale, and Richard M. Roudebush, Springfield Township, Hamilton County, Ohio, assignors to The Procter & Gamble Company, Cincinnati, Ohio, a corporation of Ohio
No Drawing. Filed Mar. 3, 1966, Ser. No. 531,362
U.S. Cl. 99—118
Int. Cl. A23d 5/02
6 Claims

ABSTRACT OF THE DISCLOSURE

A pourable storage-stable composition comprising edible oil and cocoa. The cocoa is present in an amount of from about 10% to about 30% and has an average particle size of less than about 40 microns. In a particular application, the composition is packaged as a discrete unit with a dry culinary mix.

---

This invention relates to a cocoa-flavored liquid oil compositions and more particularly to pourable, storage-stable mixtures of edible oil and cocoa powder.

The compositions of this invention are substantially similar in their appearance to chocolate syrup or chocolate liquor. They are useful in the preparation of culinary products such as ice cream, frozen desserts, icings and baked products; for example, layer cakes, cookies and brownies in which chocolate is either required or desired. The compositions of this invention are particularly advantageous for preparing rich baked goods when used in conjunction with dry, free-flowing culinary mixes. The cocoa-flavored oil compositions can be packaged in the culinary mix as a discrete unit of chocolate-flavored fluid material.

It is generally recognized that cocoa and similar powdered materials cannot be readily admixed with liquid oils to form a stable product. A portion of the oil tends to separate from the balance of the product during storage along with the air which may be incorporated in the mixture. This separation is not necessarily detrimental to the performance of the composition; however, it does seriously detract from the aesthetic appearance of the mixture and makes such mixtures commercially unattractive. A storage-stable chocolate composition comprising liquid oil and cocoa which is resistant to separation and which remains fluid and pourable over a wide range of temperatures has long been deemed desirable.

It is an object of this invention to provide a pourable, storage-stable chocolate composition which comprises a mixture of an edible liquid oil and cocoa powder.

It is another object of this invention to provide a chocolate-flavored liquid oil-containing fluid material which is suitable for use in a wide variety of culinary applications.

It is a further object of this invention to provide a packaged culinary mix for preparing rich baked goods which comprises a discrete unit of free-flowing dry ingredients and a discrete unit of cocoa-containing fluid edible oil which is storage-stable and pourable over a wide range of temperatures.

Other objects and advantages of this invention will be apparent from the following description.

Briefly, the compositions of this invention comprise pourable, storage-stable mixtures of an edible liquid oil and cocoa which have been aerated to a density of 0.80 g./cc. to 0.95 g./cc. The oil in the mixture has a fluidity of about 3 to about 12; the cocoa has an average particle size of less than about 40 microns and comprises from about 10% to about 30% by weight of the composition.

The edible oil portion of the cocoa-flavored oil composition can be derived from any naturally-occurring liquid glyceride oil such as cottonseed oil, soybean oil, peanut oil, rapeseed oil, sesame seed oil, and sunflower seed oil. Liquid oil fractions obtained from palm oil, lard and tallow by graining or directed interesterification followed by the separation of the oil can also be used. Oils which contains a substantial proportion of unsaturated fatty acids can be partially hydrogenated before use to stabilize their flavor. Care must be exercised in the hydrogenation process to avoid processing the oil in such a manner that it becomes too highly hydrogenated to remain pourable.

Other suitable edible oils for use in this invention include di- or triglycerides in which one or two of the hydroxyl groups of the glycerine have been replaced by acetic, propionic, butyric or caproic radicals, and at least one of the remaining hydroxyl groups has been replaced by an acyl radical of saturated or unsaturated fatty acid having from 12 to 22 carbon atoms.

Mixtures of oils from any of the above-described sources can be used to prepare compositions of this invention.

The liquid oils used in this invention must have a fluidity of about 3 to about 12 and preferably about 4 to about 10 to insure that the cocoa-containing compositions remain pourable over a wide range of temperatures; for example, temperatures between about 60° F. to about 80° F. and higher. The fluidity of the oil is an inverse measure of its viscosity. It is determined at a particular temperature by a fluidometer which measures the amount of oil which passes through an orifice of a specified size during a predetermined time period. The fluidometer used to determine the fluidity of the oils that are useful in this invention comprises a Saybolt cup with a Furol orifice of the type specified by the American Society of Testing Materials for measuring the fluidity of asphalt and petroleum-type products. The size of the orifice is 0.1237±.003 inch. The fluidity of the oil is the number of grams of oil which flows through the orifice during a 30 second time interval when the oil temperature is 70° F.

The cocoa used in this invention is either natural or "Dutched" chocolate from which a substantial portion of the fat or cocoa butter has been expressed or removed by solvent extraction. Dutched chocolate is prepared by treating cocoa nibs with an alkali material such as potassium carbonate in a manner well known in the art. The alkali treatment changes the characteristics of the chocolate in a number of ways, none of which is important for present considerations. Generally speaking, Dutched chocolate tends to have a darker color and to be more flavorful than natural cocoas.

A so-called "medium fat cocoa" containing from about 10% to about 22% fat is preferred for use in this invention, but cocoa containing about 12% to about 14% fat is more highly preferred because it is more readily dispersed in the liquid oil than are cocoas having either a higher or a lower fat content. The cocoa must have an average particle size of less than about 40 microns to insure uniform dispersion and storage stability. Cocoa powder having an average particle size of less than about 20 microns is preferred; the finer the particle size of the cocoa the more readily it is dispersed in the liquid oil.

The cocoa is admixed with the liquid oil in any amount from about 10% to about 30% by weight of the total composition. Amounts of cocoa less than about 10% by weight of the composition can be used; however, the color of the product tends to be somewhat insipid. While amounts of cocoa greater than about 30% by weight of the composition can be used, it has been found that compositions containing higher amounts of cocoa are not reliably fluid; they tend to become non-pourable during prolonged storage. A preferred composition contains about 15% to about 20% cocoa by weight of the total composition.

The manner in which the cocoa is admixed with the liquid oil is critical to the attainment of the objects of this invention inasmuch as the final composition must have a density of 0.80 g./cc. to 0.95 g./cc. to be storage stable. The density of the final product is a function of the maner in which the ingredients are mixed. During the mixing process, the proper amount of air is "whipped" into the composition to aerate it to the desired density.

The cocoa can be easily wetted by the liquid oil, but it has a tendency to float on the surface of the oil; therefore, a mixing method should be provided which will "fold" the cocoa into the oil or otherwise pull it under the oil surface. Agitation is essential to wet the cocoa properly; it should be continued throughout the entire mixing process until a uniform dispersion of the cocoa in the oil is achieved. A surface mixing device; for example, a "chevron" agitator or similar turbine-type mixing device, can be used in conjunction with a conventional propeller-type agitator to wet, "fold" and mix the cocoa into the oil at low speeds; for example, at speeds of about 80 r.p.m. or less. A chevron agitator is an inverted "V" type agitator which because of its shape exerts its maximum mixing effort in the deepest portions of the material being mixed. When low speed agitation is employed throughout the entire mixing process, provision for a secondary high speed mixing step at speeds up to about 150 r.p.m. should be provided to aerate the uniformly admixed product to the desired final density which may not otherwise be achieved when mixing is carried out entirely at low speeds. Initial high speed agitation before the cocoa has been fully wetted by the oil should be avoided; it has a tendency to cause an excessive entrainment of air in the product, which results in too low a final density.

The length of the time period during which the mixing operation is carried out is not critical and has very little effect on the final density of the product. Mixing should be continued until a uniform dispersion of the cocoa in the liquid oil has been achieved and until the final density of the product is between 0.80 g./cc. and 0.95 g./cc. A product aerated to a final density of 0.87 g./cc. to 0.91 g./cc. has been found to give the most storage-stable compositions and for this reason a product having a density of 0.87 g./cc. to 0.91 g./cc. is particularly preferred.

It will be apparent to those skilled in the art that the desired density of the final product can be achieved by means other than whipping air into the mixture during the mixing process. For example, an inert gas such as nitrogen can be bubbled through the mixture of cocoa and liquid oil to produce a composition having the proper density. The preferred method, however, for aerating the compositions of this invention is to entrain air in the mixture during the mixing step.

The compositions of the present invention are useful for nearly all culinary purposes which require the presence of chocolate. They are particularly useful in packaged culinary mixes which contain fluid shortening in a discrete unit which is to be combined with the dry ingredients in the mix to form a batter which can be baked into a final product. The oil in the cocoa-flavored compositions of this invention can serve as the sole shortening ingredient in a culinary product, or it can be used to supplement a portion of the shortening which may be included in the dry ingredients.

The manner in which the cocoa-flavored liquid oil composition is packaged is not critical. A flexible packet or pouch made of either transparent or opaque plastic material is particularly convenient. Laminated Mylar, Saran and polyethylene films are commonly used for packing liquid materials of the type described herein.

U.S. Patent 3,170,796, granted on Feb. 23, 1965 to Andre et al. explains the infeasibility of incorporating a high level of shortening in dry-free-flowing culinary mixes. When it is desired to prepare rich baked products containing above about 12% to about 16% shortening a portion at least of the shortening required in the final product must be provided from a separate source. Andre et al. have patented a packaged culinary mix comprising a discrete unit of free-flowing dry ingredients which includes a portion of the total required shortening in the dry ingredients and a discrete unit of fluid shortening containing an emulsifier. Weiss et al. in U.S. Patent 3,222,184, granted on Dec. 7, 1965, disclose that an emulsifier can be oriented in a portion of a liquid oil shortening incorporated in the dry ingredients of a culinary mix and that a non-emulsified edible oil can be separately packaged as a discrete unit in the mix.

The present invention provides an improvement over the Andre et al. and Weiss et al. packaged mixes: the storage-stable and pourable cocoa-flavored liquid oil compositions of the present invention can be packaged as a separate unit along with the dry ingredients in a culinary mix for preparing chocolate-containing products such as chocolate layer cakes, chocolate cookies and chocolate brownies which require more shortening than can be conveniently incorporated in a dry mix. The inclusion of the cocoa in the discrete unit of shortening improves the appearance of the shortening and has the added advantage of conveying the impression of an extra enriched final product.

The manner in which dry ingredients are formulated to produce a free-flowing culinary mix and the method by which liquid shortening is combined with the dry ingredients and other liquid materials such as water, milk or eggs to form a batter are well understood and are fully explained in the aforementioned Andre et al. and Weiss et al. patents. The presently-described cocoa-flavored liquid oil compositions can be used in the manner disclosed by Andre et al. or by Weiss et al. The presence of an emulsifier in the compositions of this invention is not essential to their pourability or storage stability. On the other hand, an emulsifier such as any of the surface active agents disclosed by Andre et al. which impart certain shortening benefits to baked products can be used if it does not detract from the desired physical properties of the compositions of this invention. Additives other than emulsifiers can also be included in the instant compositions; for example, flavor and aroma compounds, gelling agents, natural and synthetic gum materials, etc.

The following examples illustrate this invention and its essential features. Unless otherwise stated, the parts of all ingredients are given as parts by weight.

EXAMPLE 1

(A) A series of cocoa-flavored liquid oil compositions was prepared using a partially hydrogenated soybean oil having a fluidity of 7.6. The fluidity of the oil was determined at an oil temperature of 70° F. with a fluidometer comprising a Saybolt cup and Furol orifice having a bore of 0.1237±.0003 inch mounted on an electric timing device which controlled the flow of the oil through the fluidometer for a 30-second time interval. The cocoa which was dispersed in the liquid oil had an average particle size of about 14 microns; 25% of the particles were greater than 14.8 microns, 50% were greater than 11.0 microns, and 75% were greater than 7.8 microns. The fat content of the cocoa was 14.8%.

The cocoa was uniformly mixed in 100 pounds of oil in an amount equal to 20% by weight of the total composition using a conventional Hobart mixer. Speed 1 on the Hobart mixer (about 65 r.p.m.) was used to wet the cocoa particles and to uniformly disperse the cocoa in the oil. A higher speed, Speed 2, about 115 r.p.m., was used to "whip" air into the mixture to produce the six compositions having the densities shown in Table I below. The composition having the highest density was made first and removed from the mixture before the mixture was further aerated to produce the next composition with the second highest density and so on until the six compositions having densities ranging from 0.81 g./cc. to 0.92 g./cc. had been prepared and separated from each other. Fifty 2½ oz. samples of each composition were separately packaged in Mylar-Saran-polyethylene pouches which were then stored at 70° F., 90° F., and 100° F. in both vertical and horizontal positions, and observed periodically for oil and air separation. The results of the observations on the cocoa-flavored oil samples stored at 100° F. are reported in Table I. 100° F. is an abnormally high storage temperature; it was chosen for the purposes of this test to obtain accelerated aging data under the most adverse conditions.

TABLE I

| Storage time and temperature | Density, g./cc. | Oil separation | Air separation |
| --- | --- | --- | --- |
| 1 wk., 100° F | .81 | Yes, bottom | Yes. |
| 1 wk., 100° F | .84 | ----do---- | Yes. |
| 8 wks., 100° F | .87 | No | No. |
| 8 wks., 100° F | .89 | No | No. |
| 8 wks., 100° F | .91 | No | No. |
| 3 wks., 100° F | .92 | Yes, top | No. |

Table I shows that the oil separated at the bottom of the cocoa-flavored liquid oil compositions having a density of 0.81 g./cc. and 0.84 g./cc. and that oil separation appeared at the top of the samples having a density of 0.92 g./cc. The sample compositions having a density of 0.87 g./cc. to 0.91 g./cc. were completely storage-stable after eight weeks of exposure to the unusually high storage temperature of 100° F. The separation of the oil and air in the samples which were stored at 70° F. and 90° F. was similar to those stored at 100° F.; however, separation in these samples occurred much more slowly.

(B) Adjusting the fluidity of the liquid oil within the permissible range in the cocoa and liquid oil mixtures increases the stability of the products in the density ranges of 0.80 g./cc. to 0.84 g./cc. and above 0.91 g./cc. but below 0.95 g./cc. By way of illustration, additional samples were prepared in the same manner described above, but with a less fluid but partially hydrogenated soybean oil having a fluidity of 4.0. Table II records the results of the oil and air separation in fifty 2½ oz. Mylar-Saran-polyethylene pouches of these samples which were stored at 100° F.

TABLE II

| Storage time and temperature | Density, g./cc. | Oil separation | Air separation |
| --- | --- | --- | --- |
| 4 wks., 100° F | .81 | Slight | No. |
| 4 wks., 100° F | .84 | No | No. |
| 4 wks., 100° F | .87 | No | No. |
| 4 wks., 100° F | .88 | No | No. |
| 4 wks., 100° F | .90 | No | No. |
| 4 wks., 100° F | .93 | No | No. |

(C) An oil which has a fluidity greater than about 12 tends to produce compositions which are unstable at high temperatures even though the product density is within the range of 0.80 g./cc. to 0.95 g./cc. Table III shows that a low viscosity liquid oil having a fluidity of 13.5 produces compositions from which both oil and air tend to separate regardless of the product density. The observations reported in Table III were made on samples prepared in the same manner as those samples described above except for the fluidity of the oil.

TABLE III

| Storage time and temperature | Density, g./cc. | Oil separation | Air separation |
| --- | --- | --- | --- |
| 1 wk., 100° F | .85 | Yes, bottom | Yes. |
| 1 wk., 100° F | .87 | ----do---- | Yes. |
| 2 wks., 100° F | .89 | Yes, top | Yes. |
| 2 wks., 100° F | .91 | ----do---- | Yes. |

The oil separated at the bottom of the samples in Table III which had a product density of 0.85 g./cc. and 0.87 g./cc. and at the top of the samples which had a density of 0.89 g./cc. and 0.91 g./cc. The difference in the nature of the separation suggests that there may be a very narrow range of final product density at which even these mixtures might be stable to oil separation; air separation would nevertheless occur. For this reason, an oil which has a fluidity of more than about 12 cannot be used in the compositions of this invention.

(D) Cocoa-flavored liquid oil samples were prepared in the same manner described above in part A of this example except that highly viscous liquid oils having a fluidity of about 1 to about 2 were used. The resultant mixtures were storage stable but they were too thick to be conveniently poured.

Example 1 demonstrates the importance of product density control and the effect of the fluidity of the liquid oil on the resistance of the compositions of this invention to oil and air separation particularly during prolonged storage periods at adverse temperatures.

EXAMPLE 2

Compositions containing various amounts of cocoa were prepared in the same manner described in part A of Example 1 using partially hydrogenated soybean oil to determine the effect of the level of cocoa on the storage stability of the compositions. It was found that an increase in the amount of cocoa increased the solids content of the mixture and thereby lessened the tendency of the oil to separate from the composition; however, an increase in the cocoa content alone was determined not to be sufficient to stabilize an otherwise unstable mixture.

Table IV below is a typical comparison between two of these compositions which were identical in all respects except for cocoa content. The results reported in Table IV show the stabilizing influence of the higher cocoa content.

TABLE IV

| Oil fluidity | Percent cocoa [1] | Product density (g./cc.) | Days at 100° before oil separation |
| --- | --- | --- | --- |
| 12.0 | 15 | .90 | 4 |
|  | 20 |  | 7 |

[1] Having an average particle size of about 14 microns.

EXAMPLE 3

A dry, free-flowing culinary mix for the preparation of brownies was prepared by thoroughly mixing together the following ingredients:

Ingredients: Parts by weight
Finely granulated sugar _____ 43.75
Dried hard wheat flour _____ 28.32
Powdered sugar _____ 16.29
Liquid shortening (IV=105) _____ 6.73
Cocoa _____ 3.94
Minor ingredients including salt, vanilla flavor and soda _____ .97

100.00

The dry, free-flowing culinary mix was combined with a flexible packet of cocoa-flavored liquid oil and packaged in a manner which was suitable for commercial distribution and sale. The packet was made of a laminated Mylar, Saran and polyethylene film. The complete packaged culinary mix had the following composition:

Ingredients: Parts by weight
Basic dry, free-flowing mix _____ 84.375
Cocoa-flavored liquid oil packet:
  liquid shortening _____ 13.265
  cocoa (average particle size about 14 microns) _____ 2.344
  flavor _____ 0.016

100.000

The liquid shortening in the cocoa-flavored liquid oil packet was partially hydrogenated soybean oil which contained 4% by weight monoglyceride and 5% by weight triglyceride having an iodine value of 8. The fluidity of the oil including the mono- and triglycerides was 11; the density of the cocoa-flavored liquid oil packet was .89 g./cc.

After ten weeks' storage at 80° F. the packaged mix was opened, examined, and prepared into a batter by the addition of water and eggs, and baked at 350° F. for 30 minutes. The eating quality of the brownies was judged to be superior in all respects. The packet of cocoa-flavored liquid oil showed no indication of either oil or air separation when it was carefully examined before use.

The cocoa-flavored liquid oil packet used in this example can be used in conjunction with other free-flowing dry culinary mixes for preparing chocolate-containing baked products. The shortening, if any, in the dry ingredients portion of the culinary mix can be either plastic or liquid triglyceride shortening which may or may not contain emulsifiers. Emulsifiers can conveniently be incorporated in the cocoa-flavored liquid oil packet.

What is claimed is:

1. A pourable, storage-stable composition comprising an edible liquid oil having a fluidity of about 3 to about 12 and about 10% to about 30% by weight of said composition cocoa having an average particle size of less than about 40 microns, said composition being aerated to a density of 0.80 g./cc. to 0.95 g./cc.

2. The composition of claim 1 in which the fluidity of the edible liquid oil is 4 to 10.

3. The composition of claim 1 in which the cocoa is about 15% to about 20% by weight of the composition.

4. The composition of claim 1 in which the composition is aerated to a density of 0.87 g./cc. to .91 g./cc.

5. The composition of claim 1 in which the average particle size of the cocoa is less than 20 microns.

6. A process for preparing a pourable, storage-stable composition comprising an edible liquid oil and from about 10% to about 30% by weight of the composition cocoa which comprises admixing cocoa having an average particle size of less than about 40 microns with an edible liquid oil having a fluidity of about 3 to about 12 by low speed agitation until a uniform dispersion of the cocoa in the edible liquid oil is achieved and thereafter aerating the mixture of cocoa and edible liquid oil by high speed agitation to a density of 0.80 g./cc. to 0.95 g./cc.

References Cited

UNITED STATES PATENTS

| | | | |
|---|---|---|---|
| 1,984,470 | 12/1934 | Farrell | 99—123 |
| 2,199,364 | 4/1940 | Musher | 99—123 X |
| 3,170,796 | 2/1965 | Andre et al. | 99—94 |
| 3,222,184 | 12/1965 | Weiss et al. | 99—94 X |

MAURICE W. GREENSTEIN, *Primary Examiner.*

U.S. Cl. X.R.

99—23, 26, 140, 92, 94, 136, 139, 122.